(12) United States Patent
Lee et al.

(10) Patent No.: US 11,416,091 B2
(45) Date of Patent: Aug. 16, 2022

(54) TOUCH DISPLAY DEVICE

(71) Applicant: LG Display Co., Ltd., Seoul (KR)

(72) Inventors: Seon-Hee Lee, Incheon (KR); Min-Joo Kim, Seoul (KR); Sang-Hyuk Won, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/127,331

(22) Filed: Dec. 18, 2020

(65) Prior Publication Data

US 2021/0200360 A1 Jul. 1, 2021

(30) Foreign Application Priority Data

Dec. 31, 2019 (KR) .................. 10-2019-0179870

(51) Int. Cl.
*G06F 1/16* (2006.01)
*G06F 3/041* (2006.01)
(Continued)

(52) U.S. Cl.
CPC .......... *G06F 3/0412* (2013.01); *G06F 3/0443* (2019.05); *G06F 3/0446* (2019.05); *G06V 10/147* (2022.01); *G06V 40/1306* (2022.01); *H01L 27/323* (2013.01); *H01L 27/3223* (2013.01); *H01L 27/3234* (2013.01); *H01L 27/3244* (2013.01); *H01L 51/5253* (2013.01); (Continued)

(58) Field of Classification Search
CPC .. G06F 2203/04111; G06F 2203/04112; G06F 3/0412; G06F 3/0443; G06F 3/0446; G06F 1/16; G06F 3/04164; G06F 3/044; G06F 3/0445; G06F 21/32; G06K 9/0002; G06K 9/209; H01L 27/3223; H01L 27/323; H01L 27/3234; H01L 27/3244; H01L 51/5253; G06V 40/12; G06V 10/147; G06V 40/1306; G06V 40/1318
USPC ................................ 345/170–178, 690–696
See application file for complete search history.

(56) References Cited

U.S. PATENT DOCUMENTS

2012/0268423 A1* 10/2012 Hotelling ............ G06F 3/04184
345/173
2014/0241595 A1* 8/2014 Bernstein .............. G06F 3/0416
382/124

(Continued)

*Primary Examiner* — Michael J Eurice
(74) *Attorney, Agent, or Firm* — Birch, Stewart, Kolasch & Birch, LLP

(57) ABSTRACT

A touch display device includes a display unit including pixels disposed in an active area, an encapsulation unit disposed on the display unit, and a touch-fingerprint fusion sensor unit having a touch sensor function and a fingerprint sensor function in the active area on the encapsulation unit. The touch-fingerprint fusion sensor unit includes first fingerprint sensor electrodes disposed in a fingerprint sensor area on the encapsulation unit, a first touch insulating layer disposed on the first fingerprint sensor electrodes, second fingerprint sensor electrodes disposed in the fingerprint sensor area on the first touch insulating layer, a second touch insulating layer disposed on the second fingerprint sensor electrodes, and a plurality of first and second touch electrodes disposed on the second touch insulating layer. The first fingerprint sensor electrodes, the second fingerprint sensor electrodes, and the first and second touch electrodes overlap the non-emissive area.

16 Claims, 8 Drawing Sheets

(51) Int. Cl.
*G06F 3/044* (2006.01)
*G06F 21/32* (2013.01)
*H01L 27/32* (2006.01)
*H01L 51/52* (2006.01)
*G06V 10/147* (2022.01)
*G06V 40/13* (2022.01)

(52) U.S. Cl.
CPC .............. *G06F 1/16* (2013.01); *G06F 3/0445* (2019.05); *G06F 21/32* (2013.01); *G06F 2203/04111* (2013.01); *G06F 2203/04112* (2013.01)

(56) References Cited

U.S. PATENT DOCUMENTS

| | | | | |
|---|---|---|---|---|
| 2017/0336909 A1* | 11/2017 | Song | .................... | G06F 3/0446 |
| 2017/0344787 A1* | 11/2017 | Cho | .................... | G06F 3/04166 |
| 2018/0005006 A1* | 1/2018 | Chai | .................... | G06V 40/1318 |
| 2018/0088712 A1* | 3/2018 | Kim | .................... | G02F 1/13338 |
| 2018/0089487 A1* | 3/2018 | Kang | .................... | G06V 40/1306 |
| 2018/0150163 A1* | 5/2018 | Lee | .................... | G06V 40/1306 |
| 2018/0150165 A1* | 5/2018 | Kim | .................... | G06V 40/1359 |
| 2018/0164950 A1* | 6/2018 | Kang | .................... | G06V 40/1318 |
| 2018/0173923 A1* | 6/2018 | Lee | .................... | G06F 3/044 |
| 2019/0005295 A1* | 1/2019 | Jia | .................... | H01L 27/3244 |
| 2019/0042018 A1* | 2/2019 | Kim | .................... | G06F 3/0412 |
| 2019/0042021 A1* | 2/2019 | Hong | .................... | G06K 9/22 |
| 2020/0050815 A1* | 2/2020 | Hong | .................... | G06F 3/0412 |
| 2020/0257873 A1* | 8/2020 | Heo | .................... | G06K 9/00087 |
| 2020/0364431 A1* | 11/2020 | Lee | .................... | G06V 40/1324 |
| 2020/0380240 A1* | 12/2020 | Liu | .................... | G06K 9/00046 |
| 2021/0124453 A1* | 4/2021 | Lee | .................... | G06F 3/0202 |
| 2021/0159466 A1* | 5/2021 | Kim | .................... | H01L 27/3227 |
| 2021/0200360 A1* | 7/2021 | Lee | .................... | H01L 27/3223 |
| 2021/0200366 A1* | 7/2021 | Bok | .................... | H01L 27/3234 |

* cited by examiner

TOUCH DISPLAY DEVICE

CROSS-REFERENCE TO RELATED APPLICATION(S)

This application claims the priority benefit of the Korean Patent Application No. 10-2019-0179870, filed in the Republic of Korea on Dec. 31, 2019, the entire contents of which are hereby expressly incorporated by reference in its entirety into the present application.

BACKGROUND

Technical Field

The present disclosure relates to a touch display device having a fingerprint sensor disposed in a touch sensor unit, thereby improving product reliability while reducing product cost.

Description of the Related Art

A touch sensor configured to allow information to be input by a user touch on the screen of a display is applied to various display devices, such as laptop computers, monitors, and electric home appliances, as well as portable information devices, such as smartphones and tablets.

Although a touch sensor is generally manufactured in the form of a touch panel, which is attached to a display panel, development has been conducted toward a system in which the touch sensor is mounted in the display panel in order to simplify the display device and reduce manufacturing cost.

There is a necessity for a display device having a touch sensor mounted therein that is capable of improving product reliability while reducing product cost.

BRIEF SUMMARY

Accordingly, the present disclosure is directed to a touch display device that substantially obviates one or more problems due to limitations and disadvantages of the related art.

One or more embodiments of the present disclosure provides a touch display device having a fingerprint sensor disposed in a touch sensor unit, thereby improving product reliability while reducing product cost.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

A touch display device according to an embodiment includes a display unit including a plurality of pixels disposed in an active area, each pixel having an emissive area and a non-emissive area, an encapsulation unit disposed on the display unit, the encapsulation unit being configured to seal the plurality of pixels, and a touch-fingerprint fusion sensor unit having a touch sensor function and a fingerprint sensor function in the active area on the encapsulation unit. The touch-fingerprint fusion sensor unit includes a plurality of first fingerprint sensor electrodes disposed in a fingerprint sensor area on the encapsulation unit, a first touch insulating layer disposed on the first fingerprint sensor electrodes, a plurality of second fingerprint sensor electrodes disposed in the fingerprint sensor area on the first touch insulating layer, the plurality of second fingerprint sensor electrodes intersecting the plurality of first fingerprint sensor electrodes, a second touch insulating layer disposed on the second fingerprint sensor electrodes, and a plurality of first and second touch electrodes disposed on the second touch insulating layer. The first fingerprint sensor electrodes, the second fingerprint sensor electrodes, and the first and second touch electrodes overlap the non-emissive area.

The touch-fingerprint fusion sensor unit can further include a first bridge electrode disposed on a touch buffer layer, the first bridge electrode being configured to interconnect adjacent first touch electrodes via a contact hole formed through the first and second touch insulating layers, and a second bridge electrode disposed on the second touch insulating layer, the second bridge electrode being configured to interconnect adjacent second touch electrodes, and the first and second bridge electrodes can overlap the non-emissive area.

The touch-fingerprint fusion sensor unit can further include a plurality of first fingerprint routing lines individually connected to the plurality of first fingerprint sensor electrodes in the active area, the plurality of first fingerprint routing lines extending to a bezel area along the non-emissive area, and a plurality of second fingerprint routing lines individually connected to the plurality of second fingerprint sensor electrodes in the active area, the plurality of second fingerprint routing lines extending to the bezel area along the non-emissive area not overlapping the first fingerprint routing lines.

The touch-fingerprint fusion sensor unit can further include a mesh-shaped dummy pattern disposed on any one of the first and second touch insulating layers, the dummy pattern being isolated from the first and second touch electrodes, and each of the first and second touch electrodes can have a ring pattern structure. The dummy pattern can be disposed in the ring pattern structure of each of the first and second touch electrodes so as to overlap the non-emissive area, the dummy pattern being isolated from an adjacent dummy pattern disposed in an adjacent touch electrode.

The dummy pattern can be isolated from the first fingerprint sensor electrodes, the second fingerprint sensor electrodes, the first fingerprint routing lines, and the second fingerprint routing lines without overlapping.

The plurality of first fingerprint sensor electrodes can be disposed at equal intervals in the state in which at least one light-emitting area is interposed therebetween, and the plurality of second fingerprint sensor electrodes can be disposed at equal intervals in the state in which at least one light-emitting area is interposed therebetween.

Each of the plurality of first fingerprint routing lines can be disposed in the active area so as to be spaced apart from a first fingerprint routing line adjacent thereto in the state in which at least one light-emitting unit is interposed therebetween, and each of the plurality of second fingerprint routing lines can be disposed in the active area so as to be spaced apart from a second fingerprint routing line adjacent thereto in the state in which at least one light-emitting area is interposed therebetween.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
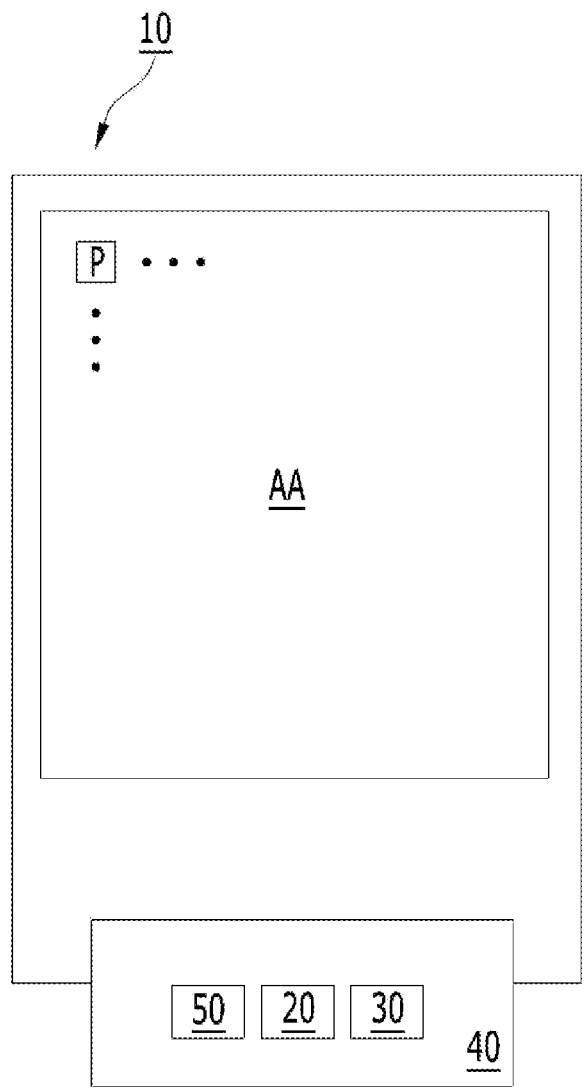
FIG. 1 is a plan view of a touch display device according to an embodiment.
Figure 2:
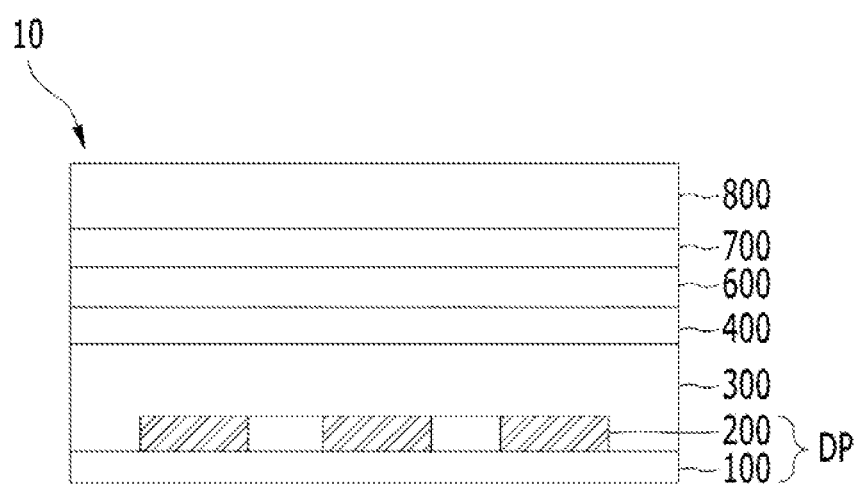
FIG. 2 is a sectional view of a touch display panel according to the embodiment.
Figure 3:
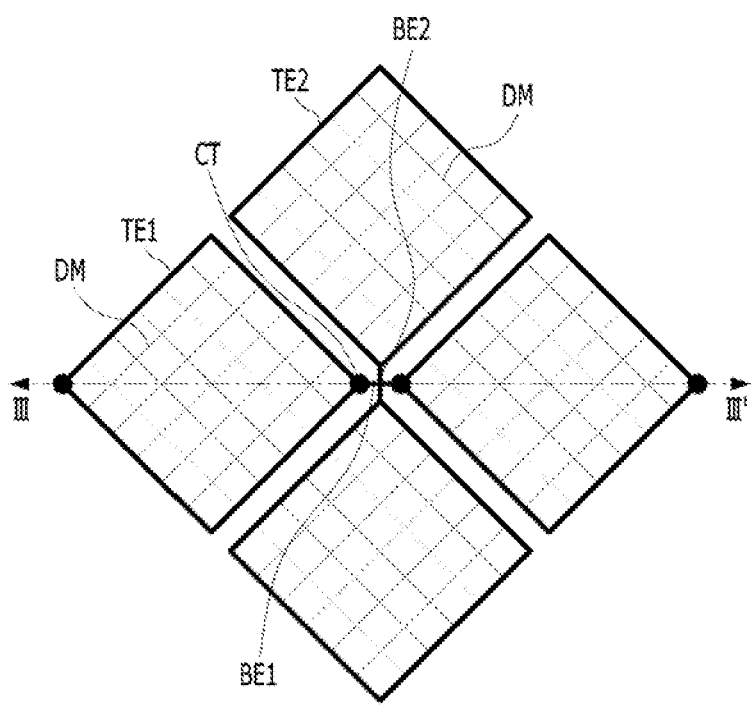
FIG. 3 is a plan view of a touch sensor according to an embodiment.
Figure 4:
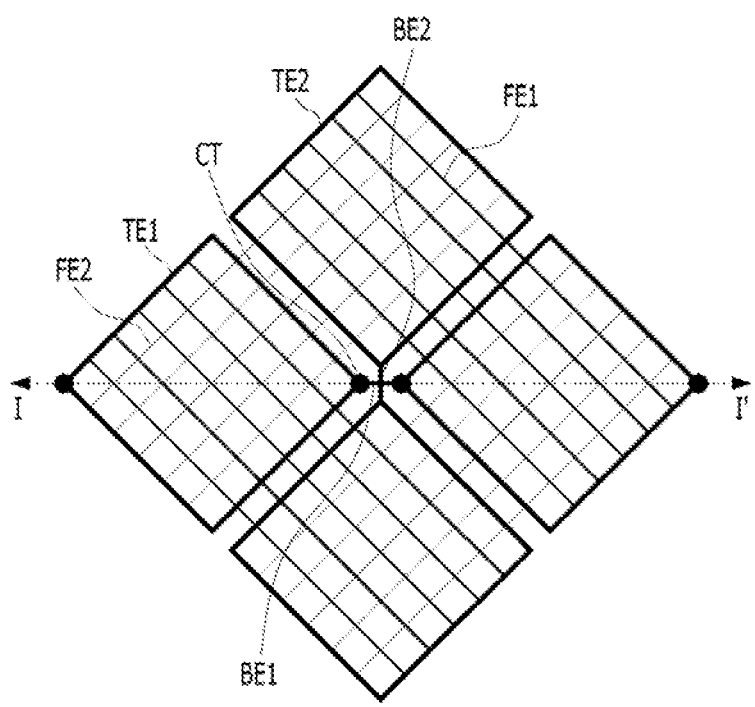
FIG. 4 is a plan view of the touch sensor and a fingerprint sensor according to an embodiment.
Figure 5:
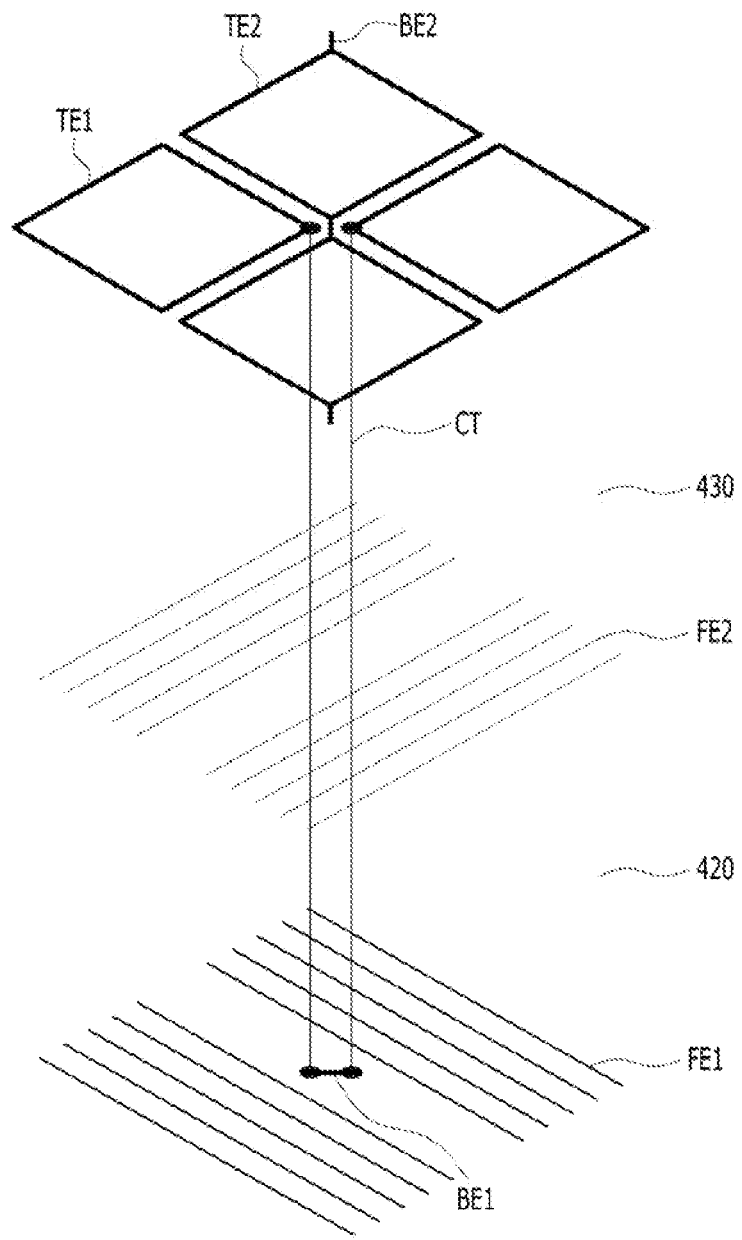
FIG. 5 is a separate view of the touch sensor and the fingerprint sensor according to the embodiment.

FIG. 1 is a plan view of a touch display device according to an embodiment, FIG. 2 is a sectional view of the touch display panel according to an embodiment, FIG. 3 is a plan view of a touch sensor according to an embodiment, FIG. 4 is a plan view of the touch sensor and a fingerprint sensor according to an embodiment, and FIG. 5 is a separate view of the touch sensor and the fingerprint sensor according to the embodiment. All the components of the touch display device according to all embodiments of the present disclosure are operatively coupled and configured.

Referring to FIGS. 1 and 2, the touch display device according to the embodiment includes a touch display panel 10 and a circuit film 40, which includes drive units 20, 30, and 50 connected to (e.g., electrically connected) the touch display panel 10.

The touch display panel 10 includes an active area AA having image display and touch sensing functions and a bezel area BZ (see FIG. 9) located outside the active area AA. The active area AA can be referred to as a display area, a pixel matrix area, or a touch sensing area, and includes a plurality of pixels P. The bezel area BZ can be referred to as a non-active area, a non-display area, or a touch non-sensing area. The touch display panel 10 includes a display unit DP having an image display function, an encapsulation unit 300 disposed on the display unit DP so as to seal a light-emitting element layer 200, and a touch-fingerprint fusion sensor unit 400 disposed on the encapsulation unit 300, the touch-fingerprint fusion sensor unit having a touch sensing function and a fingerprint sensing function. In addition, the touch display panel 10 can further include an optical film 600 attached to the touch-fingerprint fusion sensor unit 400, an optically clear adhesive (OCA) 700, and a cover substrate 800, and can further include a protective film. The optical film 600 can include a transmittance control film.

The circuit film 40, on which the display drive unit 20, the touch drive unit 30, and the fingerprint sensor drive unit 50 are mounted, is connected to a pad area of the panel 10 via an anisotropic conductive film. The touch drive unit 30 drives a touch sensor of the touch-fingerprint fusion sensor unit 400, and senses user touch through the touch sensor. The fingerprint sensor drive unit 50 drives a fingerprint sensor of the touch-fingerprint fusion sensor unit 400, and senses a user fingerprint through the fingerprint sensor. The circuit film 40 can be one of a chip on film (COF), a flexible printed circuit (FPC), and a flexible flat cable (FFC).

The display unit DP displays an image through a pixel array including a structure in which a circuit element layer 100 including a plurality of thin film transistors (TFTs) and a light-emitting element layer 200 including a plurality of light-emitting elements are stacked. Each light-emitting element can emit red light, green light, or blue light for each pixel, or can emit white light.

The encapsulation unit 300 seals the light-emitting element layer 200 on the circuit element layer 100 in order to prevent the permeation of external moisture and oxygen and to prevent the introduction and movement of particles, thereby protecting the light-emitting element layer 200.

The touch-fingerprint fusion sensor unit 400 includes a touch sensor configured to sense user touch using a capacitance scheme and a fingerprint sensor configured to sense a user fingerprint using a capacitance scheme.

The touch sensor uses a mutual-capacitance scheme in which a signal having capacitance variation between first and second touch electrodes reflected therein is provided to the touch drive unit 30. The fingerprint sensor also uses a mutual-capacitance scheme in which a signal having capacitance variation between first and second fingerprint sensor electrodes due to a user fingerprint reflected therein is provided to the fingerprint sensor drive unit 50.

Referring to FIGS. 3 to 5, the touch sensor can include first and second touch electrodes TE1 and TE2 disposed in the same layer so as to face each other in the state of being spaced apart from each other by the same distance in order to form capacitance, and each of the first and second touch electrodes TE1 and TE2 can be formed in a ring pattern including a polygonal edge, such as a diamond-shaped edge. Second touch electrodes TE2 adjacent to each other in the upward-downward direction are connected to each other via a second bridge electrode BE2 formed in the same layer. First touch electrodes TE1 adjacent to each other in the leftward-rightward direction are connected to a first bridge electrode BE1, which intersects the second bridge electrode BE2 and is formed on another layer, via contact portions CT.

Referring to FIG. 3, a mesh-shaped dummy pattern DM configured to improve visibility can be disposed inside each of the touch electrodes TE1 and TE2 surrounded by the ring pattern. The dummy pattern DM can be disposed in a different layer from the touch electrodes TE1 and TE2 so as to float, and can be isolated from the touch electrodes TE1 and TE2.

Referring to FIG. 4, a fingerprint sensor including a plurality of first fingerprint sensor electrodes FE1 spaced apart from each other by equal distances and a plurality of second fingerprint sensor electrodes FE2 spaced apart from each other by equal distances, the plurality of second fingerprint sensor electrodes FE2 intersecting the plurality of first fingerprint sensor electrodes FE1, can be disposed in different layer from the touch electrodes TE1 and TE2, instead of the dummy pattern DM shown in FIG. 3. The fingerprint sensor provides a signal indicating a change in mutual capacitance between the plurality of first fingerprint sensor electrodes FE1 and the plurality of second fingerprint sensor electrodes FE2 depending on ridges and valleys of a fingerprint located on the surface of the panel 10 to the fingerprint sensor drive unit 50.

The mesh-shaped dummy pattern DM is separated and disposed for each touch electrode area in which a corresponding one of the first and second touch electrodes TE1 and TE2 is disposed, and therefore dummy patterns disposed in adjacent touch electrodes are isolated from each other.

In contrast, the first fingerprint sensor electrode FE1 can extend so as to be disposed in an area in which at least two touch electrodes TE1 and TE2 are disposed. The first fingerprint sensor electrode FE1 disposed in the first touch electrode TE1 extends to as to be disposed in a second touch electrode TE2 adjacent thereto in a first direction. The second fingerprint sensor electrode FE2 disposed in the first touch electrode TE1 extends to as to be disposed in a second touch electrode TE2 adjacent thereto in a second direction, which is perpendicular to the first direction.

Referring to FIG. 5, the plurality of first fingerprint sensor electrodes FE1 is disposed parallel to each other in a bridge electrode layer including the first bridge electrode BE1, and a first touch insulating layer 420 is disposed thereon. The plurality of second fingerprint sensor electrodes FE2 is disposed so as to be parallel to each other and to intersect the plurality of first fingerprint sensor electrodes FE1 on the first touch insulating layer 420, and a second touch insulating layer 430 is disposed thereon. The first and second touch electrodes TE1 and TE2 and the second bridge electrode BE2 are disposed on the second touch insulating layer 430.

All of the first and second touch electrodes TE1 and TE2, the first and second bridge electrodes BE1 and BE2, the dummy pattern DM, and the first and second fingerprint sensor electrodes FE1 and FE2 overlap non-emissive areas of the pixels located in the active area AA, whereby deterioration in pixel aperture ratio is prevented.

Figure 6:
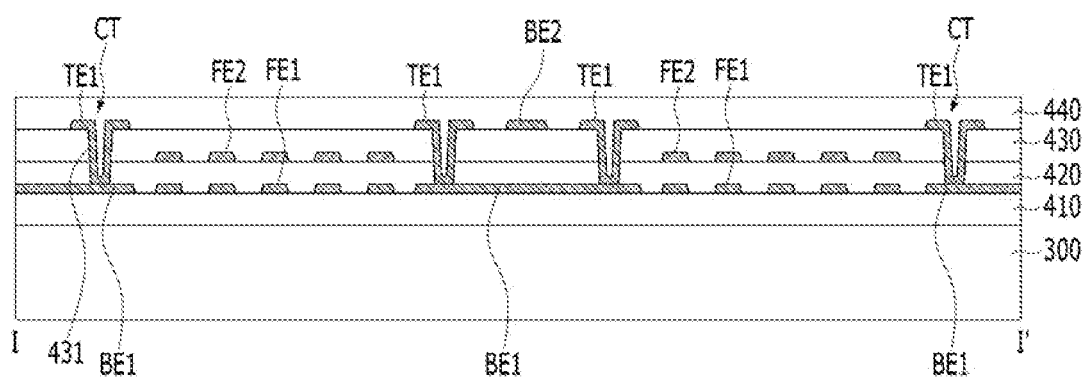
FIG. 6 is a sectional view of the touch sensor and the fingerprint sensor according to the embodiment taken along the dot-long dash line I-I' of FIG. 4.
Figure 7:
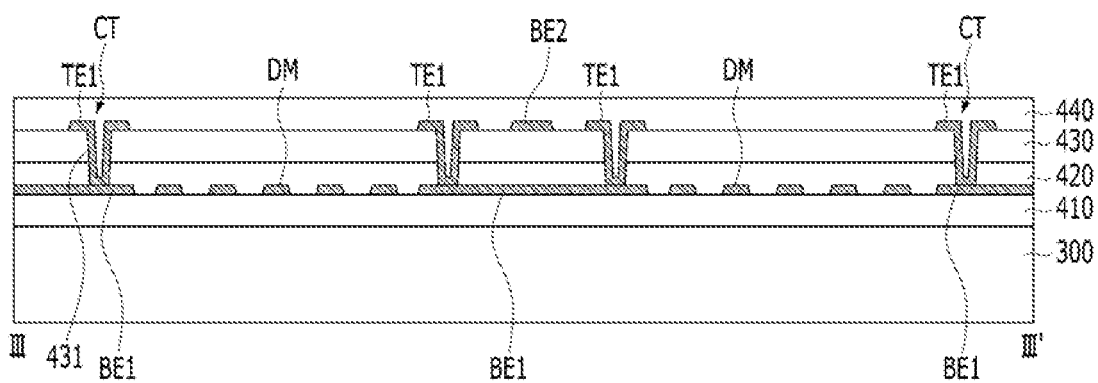
FIG. 7 is a sectional view of the touch sensor according to the embodiment taken along the dot-long dash line III-III' of FIG. 3.

FIG. 6 is a sectional view of the touch sensor and the fingerprint sensor according to the embodiment taken along the dot-long dash line I-I' of FIG. 4. FIG. 7 is a sectional view of the touch sensor according to the embodiment taken along the dot-long dash line III-III' of FIG. 3.

Referring to FIGS. 6 and 7, a bridge electrode layer including the first bridge electrode BE1 and the plurality of first fingerprint sensor electrodes FE1 is disposed between a touch buffer layer 410 and the first touch insulating layer 420 on the encapsulation unit 300. The plurality of second fingerprint sensor electrodes FE2 is disposed between the first and second touch insulating layers 420 and 430. A sensor electrode layer including the first and second touch electrodes TE1 and TE2 and the second bridge electrode BE2 is disposed between the second touch insulating layer 430 and a touch passivation layer 440. Meanwhile, the dummy pattern can be disposed in the bridge electrode layer located on the touch buffer layer 410, as shown in FIG. 7, or can be disposed in the same layer as the second fingerprint sensor electrodes FE2 located on the first touch insulating layer 420.

The first fingerprint sensor electrodes FE1 and the second fingerprint sensor electrodes FE2 can be disposed so as not to overlap the dummy pattern DM. In other words, the first fingerprint sensor electrodes FE1 and the second fingerprint sensor electrodes FE2 can be disposed in the area in which the dummy pattern DM is not formed.

The first touch electrode TE1 has a contact portion CT connected to the first bridge electrode BE1 via a contact hole 431 formed through the first and second touch insulating layers 420 and 430. Adjacent first touch electrodes TE1 are connected to each other via the contact portion CT and the first bridge electrode BE1.

Figure 8:
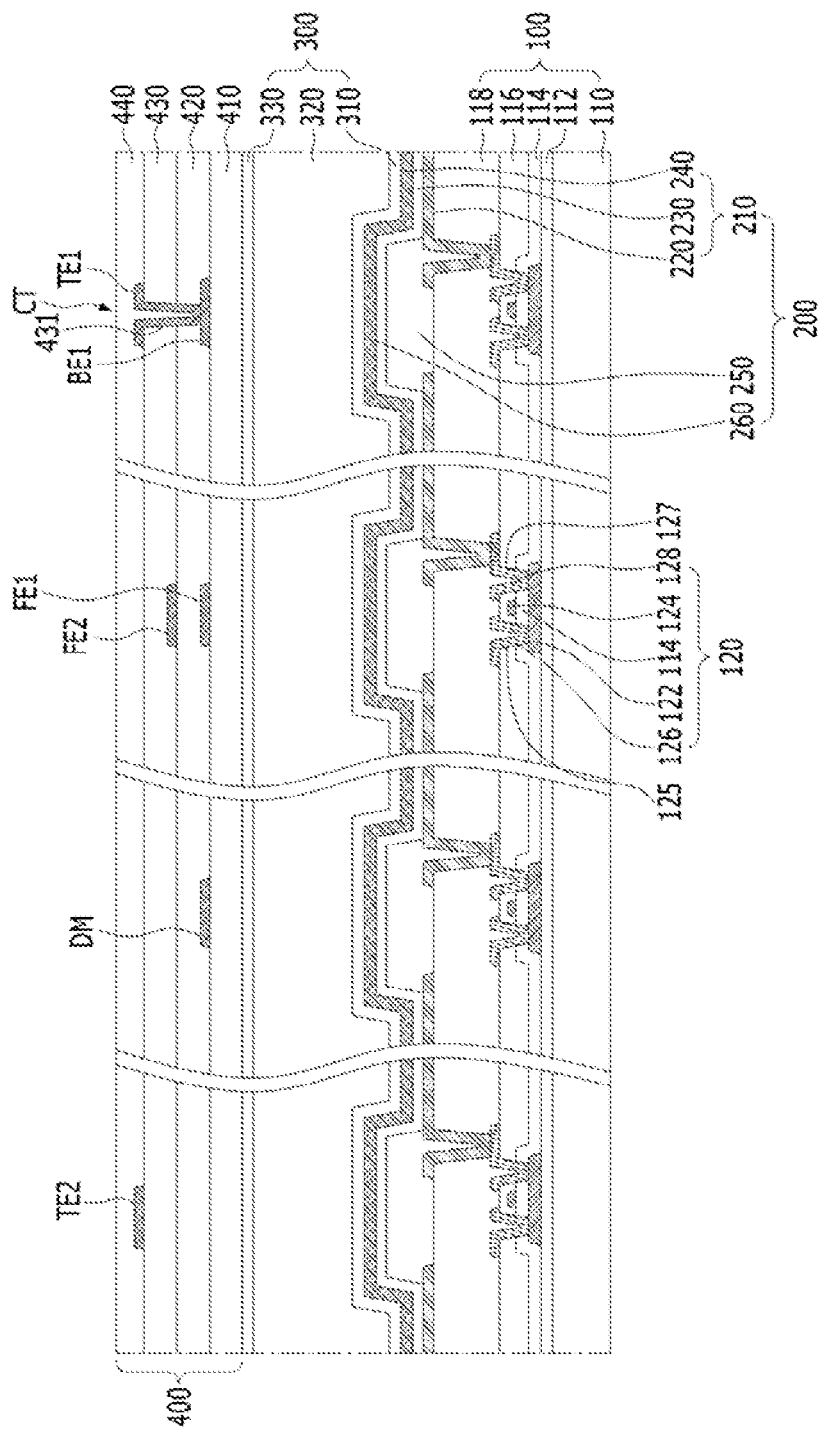
FIG. 8 is a sectional view of the touch display device according to the embodiment.

FIG. 8 is a sectional view of the touch display device according to the embodiment.

Referring to FIG. 8, the touch display device includes a circuit element layer 100 including a plurality of TFTs 120, a light-emitting element layer 200 including a plurality of light-emitting elements 210 disposed on the circuit element layer 100, an encapsulation unit 300 disposed on the light-emitting element layer 200 so as to seal the light-emitting element layer 200, and a touch-fingerprint fusion sensor unit 400 including a touch sensor and a fingerprint sensor disposed on the encapsulation unit 300.

The circuit element layer 100 includes a plurality of TFTs 120 disposed on a base substrate 110, the plurality of TFTs 120 is included in each pixel in the active area AA, and a drive circuit, such as a gate drive unit, disposed in the bezel area BZ can be further included. The circuit element layer 100 further includes a plurality of wires connected to the plurality of TFTs 120 and a storage capacitor. However, FIG. 8 typically shows a drive TFT 120 connected to a light emitting element 210 in each pixel.

The base substrate 110 can include a plastic substrate or a glass substrate. The plastic substrate can be formed of a flexible material. For example, the base substrate 110 can include at least one of an acrylic-based resin, an epoxy-based resin, a siloxane-based rein, a polyimide-based resin, and a polyamide-based resin, which is an organic insulating material.

A buffer layer 112 can be disposed between the base substrate 110 and the plurality of TFTs 120. The buffer layer 112 can prevent impurities, such as hydrogen, from being introduced into a semiconductor layer 122 of the TFT 120 through the base substrate 110. The buffer layer 112 can include an organic insulating material or an inorganic insulating material. For example, the buffer layer 112 can include an oxide-based insulating material, such as silicon oxide (SiOx) or aluminum oxide ($Al_2O_3$). Meanwhile, a barrier layer capable of preventing introduction of foreign matter can be further disposed between the base substrate 110 and the buffer layer 112. The buffer layer 112 and the barrier layer are disposed in the active area AA and the bezel area BZ.

Each of the plurality of TFTs 120 includes a semiconductor layer 122, a gate insulating layer 114, a gate electrode 124, an interlayer insulating layer 116, a first electrode 126, and a second electrode 128. One of the first electrode 126 and the second electrode 128 can be a source electrode, and the other can be a drain electrode.

The gate electrode 124, the first electrode 126, and the second electrode 128 of each TFT 120 can be formed in a single layer structure or a multilayer structure including one or an alloy of at least two of molybdenum (Mo), aluminum (Al), chromium (Cr), gold (Au), titanium (Ti), nickel (Ni), copper (Cu), neodymium (Nd), and tungsten (W).

The semiconductor layer 122 can be formed of one of an amorphous semiconductor material, a polycrystalline semiconductor material, and an oxide semiconductor material. Meanwhile, the drive TFT 120, which is one of the TFTs belonging to each pixel P, can include a polycrystalline semiconductor layer, and each of the other TFTs can include an oxide semiconductor layer.

Each of the gate insulating layer 114 and the interlayer insulating layer 116 can be formed in a single layer structure or a multilayer structure including at least one of an oxide-based insulating material and a nitride-based insulating material. The gate insulating layer 114 and the interlayer insulating layer 116 can be disposed in the active area AA and the bezel area BZ.

The gate electrode 124 is disposed on the gate insulating layer 114, which covers the semiconductor layer 122, so as to overlap the semiconductor layer 122. The first electrode 126 and the second electrode 128 formed on the interlayer insulating layer 116, which covers the gate electrode 124, are connected to the semiconductor layer 122 via contact holes 125 and 127 formed in the interlayer insulating layer 116 and the gate insulating layer 114.

A light-shielding layer overlapping the semiconductor layer 122 to prevent external light from being incident on the semiconductor layer 122 can be further provided between the buffer layer 112 and the semiconductor layer 122. The light-shielding layer can be formed of a conductive material, and can serve as a lower gate electrode, which is one of dual gate electrodes overlapping the semiconductor layer 122 above and under the semiconductor layer 122.

The circuit element layer 100 further includes a planarization layer 118 configured to cover the TFT 120 and to provide a flat surface to the light-emitting element layer 200, and at least one insulating layer can be further disposed between the TFT 120 and the planarization layer 118. The planarization layer 118 has a contact hole, through which the second electrode 128 of the TFT 120 is exposed. The planarization layer 118 can be formed of an organic insulating material, and the organic insulating material can include one of the above organic insulating materials. The planarization layer 118 can be disposed in the active area AA, and can extend to some of the bezel areas BZ adjacent to the active area AA. Also, in the case in which the bezel area including the pad area, which is one of the bezel areas BZ, is bent, the planarization layer 118 can be further disposed in the bent bezel area so as to overlap wires, whereby it is possible to reduce bending stress applied to the wires and to prevent open-circuit defects.

A light-emitting element layer 200 including a light-emitting element 210 and a bank 250 is formed on the planarization layer 118. The light-emitting element layer 200 can further include a spacer disposed on the bank 250. The light-emitting element layer 200 is disposed in the active area AA, and the bank 250 can extend to a portion of the bezel area BZ.

The light-emitting element 210 can include a first electrode 220 connected to the TFT 120, a light-emitting stack 230, and a second electrode 240. One of the first electrode 220 and the second electrode 240 can be an anode, and the other can be a cathode. The first electrode 220 can be independently separated and disposed for each pixel P, and the second electrode 240 can be a common electrode that is commonly disposed in the plurality of pixels P and is connected along the surfaces of the bank 250 and the spacer.

The first electrode 220 is disposed on the planarization layer 118, and is connected to the second electrode 128 of the TFT 120 via the contact hole formed through the planarization layer 118. The first electrode 220 can be formed in a structure including a plurality of conductive layers exhibiting high reflectance. For example, the first electrode 220 can be formed in a stack structure (Ti/Al/Ti) of aluminum (Al) and titanium (Ti), a stack structure (ITO/Al/ITO) of aluminum (Al) and indium tin oxide (ITO), or a stack structure (ITO/APC/ITO) of APC and ITO. APC is an alloy of silver (Ag), palladium (Pd), and copper (Cu).

The bank 250 which has an opening configured to expose the first electrode 220 and is configured to cover the end of the first electrode 220 is disposed on the planarization layer 118 having the first electrode 220 formed thereon. The opening of the bank 250 can be defined as an emissive area, and the area in which the bank 250 is disposed can be defined as a non-emissive area. The bank 250, which surrounds the emissive area, can be formed in a single layer structure or a double layer structure. A spacer having an opening wider than the opening of the bank 250 can be further disposed on the bank 250. The spacer can support a deposition mask when a light-emitting layer of the light-emitting stack 230 is formed. Each of the bank 250 and the spacer can be formed of the above organic insulating material. The bank 250 includes a light-shielding material, whereby it is possible to prevent backlight bleeding between adjacent pixels and to inhibit reflection of external light.

The light-emitting stack 230 can be formed by stacking a hole control layer, a light-emitting layer, and an electron control layer in that order or in reverse order. The hole control layer and the electron control layer are common layers that are commonly formed in the plurality of pixels P, and the light-emitting layer can be independently formed in the emissive area of each pixel P. The hole control layer can include at least a hole transport layer selected from between a hole injection layer and the hole transport layer, and the electron control layer can include at least an electron transport layer selected from between the electron transport layer and an electron injection layer. The light-emitting layer can generate one of red light, green light, and blue light, and can be formed in an emissive area of a corresponding pixel P through an opening of a fine metal mask (FMM), which is a deposition mask. The light-emitting layer overlapping the first electrode 220 can be disposed so as to overlap the end of the bank 250.

Meanwhile, the light-emitting stack 230 can include a plurality of light-emitting stacks overlapping in the state in which a charge generation layer is interposed therebetween to generate white light, and the plurality of light-emitting stacks can be formed as a common layer that is commonly formed in the plurality of pixels P. A color filter layer configured to emit each of red light, green light, and blue light using white light can be further provided in an optical path along which white light is emitted from the light-emitting stack 230. The color filter layer can include a color filter overlapping the emissive area of each pixel P and a black matrix overlapping the non-emissive area, and can be disposed above or under the touch-fingerprint fusion sensor unit 400. The color filter and the black matrix can absorb external light, whereby it is possible to inhibit reflection of external light and to improve external visibility.

The second electrode 240 is disposed on the light-emitting stack 230, and is also disposed on the bank 250 and the spacer, whereby the second electrode 240 can also be referred to a common electrode that is commonly formed in the plurality of pixels P. The second electrode 240 can be formed of a conductive material having high light transmittance or a semi-transmissive conductive material. For example, the second electrode 240 can be formed of a transparent conductive material, such as ITO or IZO. The second electrode 240 can be formed of a semi-transmissive metal material, such as magnesium (Mg), silver (Ag), or an alloy thereof. A capping layer can be further disposed on the second electrode 240 in order to improve light resonance and light emission efficiency of the light-emitting element 210. The second electrode 240 can be disposed over the entire active area AA, and can extend to the bezel area BZ so as to be connected to a power supply line disposed on another layer in the bezel area BZ.

The encapsulation unit 300 configured to seal the light-emitting element layer 200 can be disposed on the light-emitting element layer 200, whereby it is possible to prevent moisture or oxygen from permeating into the light-emitting element layer 200 and to prevent introduction or movement of foreign matter. The encapsulation unit 300 can have a stack structure in which n inorganic encapsulation layers 310 and 330 (n being an integer equal to or greater than 2) and (n−1) organic encapsulation layers 320 are alternately disposed. The inorganic encapsulation layers 310 and 330 can prevent permeation of external moisture or oxygen. The organic encapsulation layer 320 can serve to prevent introduction or movement of foreign matter and to alleviate stress between layers when the display panel is bent.

The encapsulation unit 300 has a stack structure in which the organic encapsulation layer 320 is disposed between the upper and lower inorganic encapsulation layers 310 and 330. The plurality of inorganic encapsulation layers 310 and 330 can be disposed in the active area AA, and can extend to the bezel area BZ. The inorganic encapsulation layers 310 and 330 are formed in a structure configured to entirely wrap the upper surface, the lower surface, and the side surface of the organic encapsulation layer 320, and contact each other at the edge of the bezel area that does not overlap the organic encapsulation layer 320.

Each of the plurality of inorganic encapsulation layers 310 and 330 is formed of an inorganic insulating material that can be processed in a low-temperature process, and the organic encapsulation layer 320 is formed of an organic insulating material that can be processed in the low-temperature process. The inorganic insulating material can include one of silicon nitride, silicon oxide, silicon oxynitride, and aluminum oxide. The organic insulating material can include one of the above-described organic insulating materials.

The touch-fingerprint fusion sensor unit 400 includes a touch buffer layer 410, a bridge metal layer, a first touch insulating layer 420, a second fingerprint sensor layer, a second touch insulating layer 430, a sensor metal layer, and a touch passivation layer 440, which are sequentially stacked on the encapsulation unit 300. The touch buffer layer 410 can be omitted.

Each metal layer constituting the touch-fingerprint fusion sensor unit 400 can be formed of an opaque metal material that exhibits high corrosion resistance, acid resistance, and conductivity, and can have a single layer structure or a multilayer structure. For example, each metal layer of the touch-fingerprint fusion sensor unit 400 can be formed in a single layer structure or a multilayer structure including at least one of molybdenum (Mo), aluminum (Al), chromium (Cr), gold (Au), titanium (Ti), nickel (Ni), copper (Cu), neodymium (Nd), tungsten (W), and an alloy thereof. Each metal layer of the touch-fingerprint fusion sensor unit 400 can be formed in a structure in which three metal layers are stacked, such as Ti/Al/Ti, Mo/Al/Mo, MoTi/Cu/MoTi, or Ti/Al/Mo.

Each of the touch buffer layer 410, the first touch insulating layer 420, the second touch insulating layer 430, and the touch passivation layer 440 can be formed of an insulating material that can be processed in the low-temperature process. Each of the touch buffer layer 410 and the second touch insulating layer 430 can be formed of an inorganic insulating material or an organic insulating material. The touch passivation layer 440 configured to protect the sensor metal layer can provide a flat surface, and can be formed of one of an acrylic-based organic insulating material, a polyimide-based organic insulating material, and a siloxane-based organic insulating material, which are photocurable organic insulating materials that can be processed in the low-temperature process.

The bridge metal layer located between the touch buffer layer 410 and the first touch insulating layer 420 includes a plurality of bridge electrodes BE1 and a plurality of first fingerprint sensor electrodes FE1 disposed in the non-emissive area of the active area AA.

The metal layer located between the first and second touch insulating layers 420 and 430 includes a plurality of second fingerprint sensor electrodes FE2 disposed in the non-emissive area of the active area AA.

The sensor metal layer located between the second touch insulating layer 430 and the touch passivation layer 440 includes a plurality of first and second touch electrodes TE1 and TE2 and a second bridge electrode BE2 disposed in the non-emissive area of the active area AA. The first touch electrode TE1 has a contact portion CT connected to the first bridge electrode BE1 via the contact hole 431 formed through the first and second touch insulating layers 420 and 430.

Figure 9:
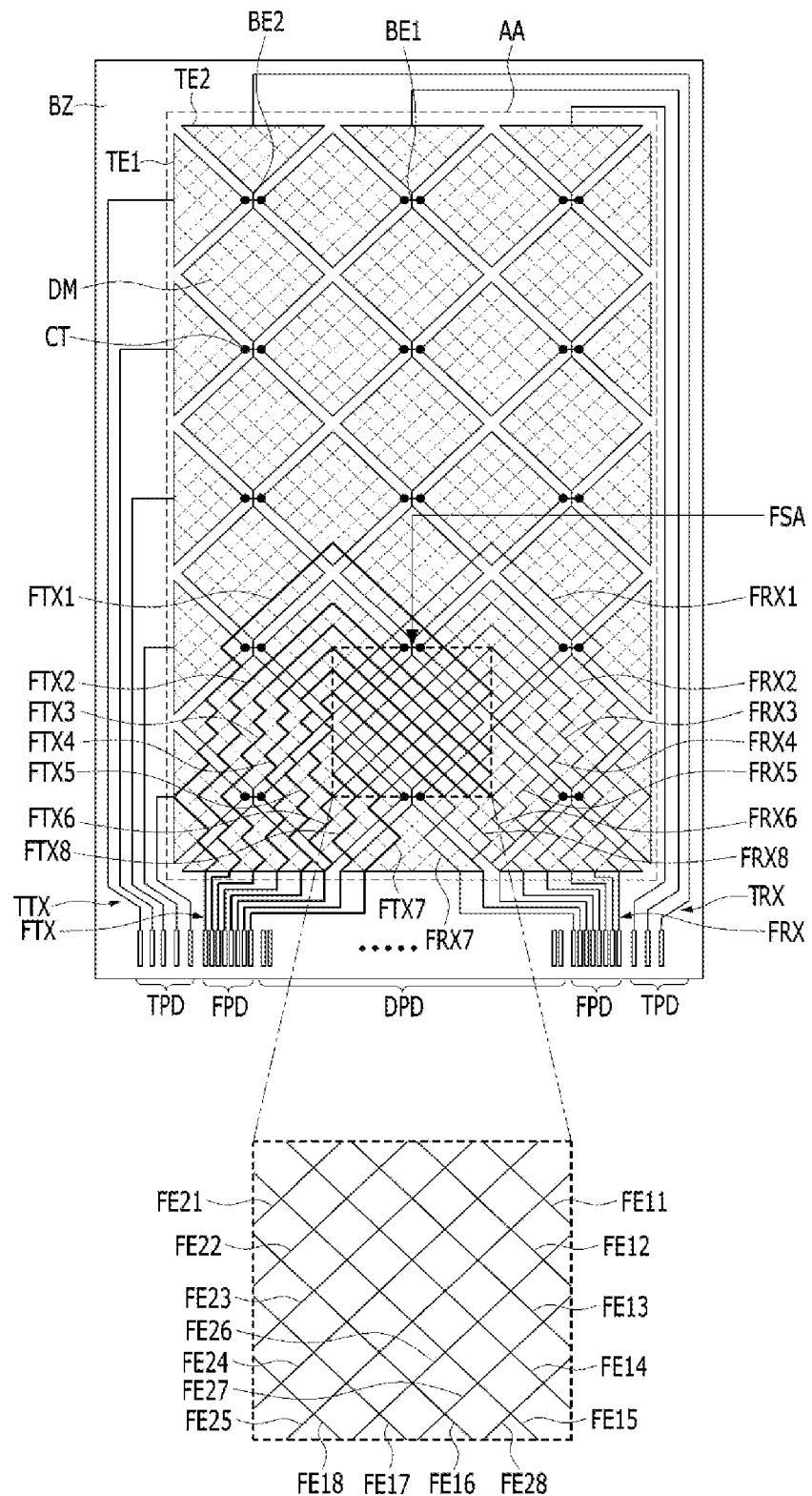
FIG. 9 is a plan view of the touch display device according to the embodiment.

FIG. 9 is a plan view of a touch-fingerprint fusion sensor unit according to an embodiment.

Referring to FIG. 9, the touch-fingerprint fusion sensor unit includes a plurality of first touch electrode channels constituted by a plurality of first touch electrodes TE1 electrically connected to each other while being arranged in the active area AA in a first direction (e.g., an X-axis direction or a horizontal direction) and a plurality of second touch electrode channels constituted by a plurality of second touch electrodes TE2 electrically connected to each other while being arranged in the active area AA in a second direction (e.g., a Y-axis direction or a vertical direction).

Each of the first touch electrodes TE1 arranged in the first direction X in each first touch electrode channel is connected to a first touch electrode TE1 adjacent thereto via a first bridge electrode BE1. Each of the second touch electrodes TE2 arranged in the second direction Y in each second touch electrode channel is connected to a second touch electrode TE2 adjacent thereto via a second bridge electrode BE2. The first touch electrodes TE1 can be referred to as transmission electrodes, and the second touch electrodes TE2 can be referred to as reception electrodes. The first touch electrode channels can be referred to as transmission channels, and the second touch electrode channels can be referred to as reception channels or readout channels.

Each of the first and second touch electrodes TE1 and TE2 can be formed in a quadrangular ring pattern, and each of the outer touch electrodes TE1 and TE2 located adjacent to the bezel area can be formed in a triangular ring pattern. In addition, each of the touch electrodes TE1 and TE2 can be formed so as to have various other polygonal shapes.

A plurality of touch routing lines TTX and TRX connected to the touch electrodes TE1 and TE2 in the active area AA for each channel can be disposed in the bezel area BZ of the touch-fingerprint fusion sensor unit.

One-side ends of the plurality of first touch electrode channels disposed in the active area AA can be connected to the plurality of first touch routing lines TTX disposed in the left bezel area BZ, and the plurality of first touch routing lines TTX can be connected to the touch drive unit 30 through touch pads TPD disposed in the lower bezel area BZ via the left bezel area BZ and the lower bezel area BZ.

One-side ends of the plurality of second touch electrode channels disposed in the active area AA can be connected to the second touch routing lines TRX disposed in the upper bezel area BZ, and the second touch routing lines TRX can be connected to the touch drive unit 30 through the touch pads TPD disposed in the lower bezel area BZ via the right bezel area BZ and the lower bezel area BZ.

A mesh-shaped dummy pattern DM is disposed inside each of the first and second touch electrodes TE1 and TE2 so as to be isolated from the first and second touch electrodes TE1 and TE2. The dummy pattern DM is disposed so as not to overlap a plurality of first fingerprint sensor electrodes FE11 to FE18 and a plurality of second fingerprint sensor electrodes FE21 to FE28 disposed in a fingerprint sensor area FSA. The dummy pattern DM does not overlap a plurality of first fingerprint routing lines FTX1 to FTX8 individually connected to the plurality of first fingerprint sensor electrodes FE11 to FE18 in the active area AA and extending to the bezel area BZ. The dummy pattern DM does not overlap a plurality of second fingerprint routing lines FRX1 to FRX8 individually connected to the plurality of second fingerprint sensor electrodes FE21 to FE28 in the active area AA and extending to the bezel area BZ.

In the fingerprint sensor area FSA, the plurality of first fingerprint sensor electrodes FE11 to FE18 and the plurality of second fingerprint sensor electrodes FE21 to FE28 are disposed so as to have an intersection structure. The fingerprint sensor area FSA can be disposed in at least one touch electrode area, or can extend to a plurality of touch electrode areas. The plurality of first fingerprint sensor electrodes FE11 to FE18 overlap the non-emissive areas of the pixels in the fingerprint sensor area FSA, and can be disposed at equal intervals in the state in which the emissive area of at least one pixel is interposed therebetween. The plurality of second fingerprint sensor electrodes FE21 to FE28 intersects the plurality of first fingerprint sensor electrodes FE11 to FE18 in the fingerprint sensor area FSA, can overlap the non-emissive areas of the pixels, and can be disposed at equal intervals in the state in which the emissive area of at least one pixel is interposed therebetween. Preferably, the fingerprint sensor area FSA in which the plurality of first fingerprint sensor electrodes FE11 to FE18 and the plurality of second fingerprint sensor electrodes FE21 to FE28 intersect has a size greater than a size of an area in which one of the first and second touch electrodes TE1 and TE2 is disposed.

The plurality of first fingerprint routing lines FTX1 to FTX8 individually connected to the plurality of first fingerprint sensor electrodes FE11 to FE18 of the fingerprint sensor area FSA in the active area AA is disposed along the non-emissive areas of the pixels, extends to the lower bezel area BZ, and is individually connected to first bezel routing lines FTX and fingerprint pads FPD disposed in the lower bezel area BZ. The plurality of first fingerprint routing lines FTX1 to FTX8 can be disposed at equal intervals in the state in which the emissive area of at least one pixel is interposed therebetween. The plurality of second fingerprint routing lines FRX1 to FRX8 individually connected to the plurality of second fingerprint sensor electrodes FE21 to FE28 of the fingerprint sensor area FSA in the active area AA is disposed along the non-emissive areas of the pixels, extends to the lower bezel area BZ, and is individually connected to second bezel routing lines FRX and the fingerprint pads FPD disposed in the lower bezel area BZ. The plurality of second fingerprint routing lines FRX1 to FRX8 can be disposed at equal intervals in the state in which the emissive area of at least one pixel is interposed therebetween.

The plurality of first fingerprint sensor electrodes FE11 to FE18, the plurality of second fingerprint sensor electrodes FE21 to FE28, the plurality of first fingerprint routing lines FTX1 to FTX8, and the plurality of second fingerprint routing lines FRX1 to FRX8 disposed in a different layer from the first and second touch electrodes TE1 and TE2 in the active area AA are disposed in the non-emissive area in which no dummy pattern DM is formed.

Meanwhile, display pads DPD connected to the signal lines of the display unit can be further disposed between the fingerprint pads FPD.

The circuit film 40 described with reference to FIG. 1 is bonded to the pad area in which the touch pads TPD, the fingerprint pads FPD, and the display pads DPD are formed, whereby the pads are connected to the display drive unit 20, the touch drive unit 30, and the fingerprint sensor drive unit 50, which are mounted on the circuit film 40.

As is apparent from the above description, in the touch display device according to the embodiment, the fingerprint sensor electrodes are disposed in the touch-fingerprint fusion sensor unit instead of the dummy patterns of the touch sensors, whereby additional fingerprint recognition sensor parts are not necessary. Consequently, it is possible to slim down the display device and reduce costs related to the parts and fabrication.

In the touch display device according to the embodiment, the fingerprint sensor electrodes and the fingerprint routing lines are disposed so as to overlap the non-emissive areas of the pixels as in the touch patterns of the touch electrodes, whereby it is possible to prevent or minimize deterioration in visibility.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the specific embodiments.

What is claimed is:
1. A touch display device comprising:
a display unit comprising a plurality of pixels disposed in an active area, each pixel having an emissive area and a non-emissive area;
an encapsulation unit disposed on the display unit, the encapsulation unit being configured to seal the plurality of pixels; and
a touch-fingerprint fusion sensor unit having a touch sensor function and a fingerprint sensor function in the active area on the encapsulation unit,
wherein the touch-fingerprint fusion sensor unit comprises:
a plurality of first fingerprint sensor electrodes disposed in a fingerprint sensor area on the encapsulation unit;
a first touch insulating layer disposed on the plurality of first fingerprint sensor electrodes;
a plurality of second fingerprint sensor electrodes disposed in the fingerprint sensor area on the first touch insulating layer, the plurality of second fingerprint sensor electrodes intersecting the plurality of first fingerprint sensor electrodes;
a second touch insulating layer disposed on the plurality of second fingerprint sensor electrodes;
a plurality of first and second touch electrodes disposed on the second touch insulating layer;

a first bridge electrode disposed on the encapsulation unit, the first bridge electrode being configured to interconnect adjacent first touch electrodes via a contact hole formed through the first and second touch insulating layers; and a second bridge electrode disposed on the second touch insulating layer, the second bridge electrode being configured to interconnect adjacent second touch electrodes, and wherein the plurality of first fingerprint sensor electrodes, the plurality of second fingerprint sensor electrodes, and the plurality of first and second touch electrodes overlap the non-emissive area.

2. The touch display device according to claim 1, wherein the first and second bridge electrodes overlap the non-emissive area.

3. The touch display device according to claim 1, wherein the fingerprint sensor area in which the plurality of first fingerprint sensor electrodes and the plurality of second fingerprint sensor electrodes intersect has a size greater than a size of an area in which one of the plurality of first and second touch electrodes is disposed.

4. The touch display device according to claim 1, wherein each of the plurality of first and second touch electrodes has a ring pattern structure, and at least one of the first fingerprint sensor electrodes and the second fingerprint sensor electrodes is disposed in the ring pattern structure of each of the plurality of first and second touch electrodes.

5. The touch display device according to claim 1, further comprising:

a plurality of first fingerprint routing lines individually connected to the plurality of first fingerprint sensor electrodes in the active area, the plurality of first fingerprint routing lines extending to a bezel area along the non-emissive area; and a plurality of second fingerprint routing lines individually connected to the plurality of second fingerprint sensor electrodes in the active area, the plurality of second fingerprint routing lines extending to the bezel area along the non-emissive area not overlapping the plurality of first fingerprint routing lines.

6. The touch display device according to claim 5, wherein the plurality of first fingerprint sensor electrodes are disposed at equal intervals in a state in which at least one light-emitting area is interposed therebetween, and the plurality of second fingerprint sensor electrodes are disposed at equal intervals in a state in which at least one light-emitting area is interposed therebetween.

7. The touch display device according to claim 5, wherein each of the plurality of first fingerprint routing lines is disposed in the active area so as to be spaced apart from a first fingerprint routing line adjacent thereto in a state in which at least one light-emitting area is interposed therebetween, and each of the plurality of second fingerprint routing lines is disposed in the active area so as to be spaced apart from a second fingerprint routing line adjacent thereto in a state in which at least one light-emitting area is interposed therebetween.

8. The touch display device according to claim 5, wherein the touch-fingerprint fusion sensor unit further comprises a mesh-shaped dummy pattern disposed on any one of the first and second touch insulating layers, the dummy pattern being isolated from the first and second touch electrodes, each of the plurality of first and second touch electrodes has a ring pattern structure, and the dummy pattern is disposed in the ring pattern structure of each of the plurality of first and second touch electrodes so as to overlap the non-emissive area, the dummy pattern being isolated from an adjacent dummy pattern disposed in an adjacent touch electrode.

9. The touch display device according to claim 8, wherein the dummy pattern is isolated from the plurality of first fingerprint sensor electrodes, the plurality of second fingerprint sensor electrodes, the plurality of first fingerprint routing lines, and the plurality of second fingerprint routing lines without overlapping.

10. A touch display device comprising:

a display unit comprising a plurality of pixels disposed in an active area, each pixel having an emissive area and a non-emissive area;

an encapsulation unit disposed on the display unit, the encapsulation unit being configured to seal the plurality of pixels;

a touch-fingerprint fusion sensor unit having a touch sensor function and a fingerprint sensor function in the active area on the encapsulation unit, wherein the touch-fingerprint fusion sensor unit comprises:

a plurality of first fingerprint sensor electrodes disposed in a fingerprint sensor area on the encapsulation unit;

a first touch insulating layer disposed on the plurality of first fingerprint sensor electrodes;

a plurality of second fingerprint sensor electrodes disposed in the fingerprint sensor area on the first touch insulating layer, the plurality of second fingerprint sensor electrodes intersecting the plurality of first fingerprint sensor electrodes;

a second touch insulating layer disposed on the plurality of second fingerprint sensor electrodes; and a plurality of first and second touch electrodes disposed on the second touch insulating layer, and wherein the plurality of first fingerprint sensor electrodes, the plurality of second fingerprint sensor electrodes, and the plurality of first and second touch electrodes overlap the non-emissive area;

a plurality of first fingerprint routing lines individually connected to the plurality of first fingerprint sensor electrodes in the active area, the plurality of first fingerprint routing lines extending to a bezel area along the non-emissive area; and a plurality of second fingerprint routing lines individually connected to the plurality of second fingerprint sensor electrodes in the active area, the plurality of second fingerprint routing lines extending to the bezel area along the non-emissive area not overlapping the plurality of first fingerprint routing lines.

11. The touch display device according to claim 10, wherein the plurality of first fingerprint sensor electrodes are disposed at equal intervals in a state in which at least one light-emitting area is interposed therebetween, and the plurality of second fingerprint sensor electrodes are disposed at equal intervals in a state in which at least one light-emitting area is interposed therebetween.

12. The touch display device according to claim 10, wherein each of the plurality of first fingerprint routing lines is disposed in the active area so as to be spaced apart from a first fingerprint routing line adjacent thereto in a state in which at least one light-emitting area is interposed therebetween, and each of the plurality of second fingerprint routing lines is disposed in the active area so as to be spaced apart from a second fingerprint routing line adjacent thereto in a state in which at least one light-emitting area is interposed therebetween.

13. The touch display device according to claim 10, wherein the fingerprint sensor area in which the plurality of first fingerprint sensor electrodes and the plurality of second fingerprint sensor electrodes intersect has a size greater than a size of an area in which one of the plurality of first and second touch electrodes is disposed.

14. The touch display device according to claim 10, wherein each of the plurality, of first and second touch electrodes has a ring pattern structure, and
at least one of the first fingerprint sensor electrodes and the second fingerprint sensor electrodes is disposed in the ring pattern structure of each of the plurality of first and second touch electrodes.

15. The touch display device according to claim 10, wherein the touch-fingerprint fusion sensor unit further comprises a mesh-shaped dummy pattern disposed on any one of the first and second touch insulating layers, the dummy pattern being isolated from the first and second touch electrodes,
each of the plurality of first and second touch electrodes has a ring pattern structure, and
the dummy pattern is disposed in the ring pattern structure of each of the plurality of first and second touch electrodes so as to overlap the non-emissive area; the dummy pattern being isolated from an adjacent dummy pattern disposed in an adjacent touch electrode.

16. The touch display device according to claim 15, wherein the dummy pattern is isolated from the plurality of first fingerprint sensor electrodes, the plurality of second fingerprint sensor electrodes, the plurality of first fingerprint routing lines, and the plurality of second fingerprint routing lines without overlapping.

* * * * *